(12) United States Patent
Murai et al.

(10) Patent No.: US 7,426,882 B2
(45) Date of Patent: Sep. 23, 2008

(54) GEAR-SHIFTING DEVICE FOR MANUAL TRANSMISSION

(75) Inventors: Akifumi Murai, Saitama (JP); Susumu Saitou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 651 days.

(21) Appl. No.: 10/876,639

(22) Filed: Jun. 28, 2004

(65) Prior Publication Data
US 2005/0005724 A1    Jan. 13, 2005

(30) Foreign Application Priority Data
Jul. 9, 2003    (JP)    ............................. P2003-193989

(51) Int. Cl.
B60K 20/00 (2006.01)
F16H 59/04 (2006.01)
F16H 63/32 (2006.01)

(52) U.S. Cl. ................................. 74/473.36; 74/473.37

(58) Field of Classification Search .............. 74/473.25, 74/473.29, 473.36, 473.37
See application file for complete search history.

(56) References Cited

U.S. PATENT DOCUMENTS 3,780,596 A * 12/1973 Takahashi et al. ........ 74/473.34
4,338,828 A * 7/1982 Ruhlman .................. 74/473.27
4,916,966 A * 4/1990 Weishaupt et al. ........ 74/473.29
6,658,959 B2 * 12/2003 Wildeshaus et al. ...... 74/473.27

FOREIGN PATENT DOCUMENTS

JP    6-316227    11/1994
JP    2000-240683    9/2000

OTHER PUBLICATIONS

Shoji Kato et al., Non-patent document, "Study on the prevention of 2-step motion in a gear change of manual transmission" pp. 33-38.

* cited by examiner

Primary Examiner—Richard W L Ridley
Assistant Examiner—Justin Krause
(74) Attorney, Agent, or Firm—Westerman, hattori, Daniels & Adrian, LLP.

(57) ABSTRACT

A gear-shifting device 50 for a manual transmission comprises a shift arm 53, which is rotatable in correspondence to the shift operation of a change-lever L, and shift pieces 41, 43 and 45, each of which shifts in correspondence to the rotation of the shift arm 53, with this shifting of the shift piece 41 achieving a gear shift. The gear-shifting device 50 further comprises a load-attenuating mechanism 90, which includes a spline groove 51b, a fitting room 91, a steel ball 92 and a coned spring 93. In the attenuating mechanism, the steel ball 92 is pushed to the spline groove 51b by the coned spring 93, allowing the shift arm 53 to rotate with respect to the shift selector shaft 51 to reduce the load acting on the change-lever L from synchro-sleeves 71, 73 and 75.

3 Claims, 7 Drawing Sheets

GEAR-SHIFTING DEVICE FOR MANUAL TRANSMISSION

FIELD OF THE INVENTION

The present invention relates generally to a gear-shifting device for a manual transmission, which device actuates a shift fork to bring into engagement selectively a clutch that establishes a power transmission through a corresponding gear train in gear-shifting control. The present invention relates particularly to a gear-shifting device in which a force applied in operating the change-lever manually is transmitted selectively to a shift fork to bring a corresponding clutch into engagement in the manual transmission.

BACKGROUND OF THE INVENTION

Generally, in a manual transmission (manual gear-shift transmission), when the driver operates the change-lever for a shift, the force applied by the driver in the operation is transmitted through a gear-shifting device to a shift fork, so that the shift fork sets a corresponding clutch (for example, a synchromesh mechanism) into engagement, establishing a desired speed change ratio for the transmission. Such clutches are arranged over either of the parallel input and output shafts of the transmission, in correspondence to permanently meshing gear trains of various speed change ratios, which gear trains are disposed over these parallel shafts in parallel with one another.

For a smooth gear shifting involving little resistance, such a transmission generally incorporates a frictionally synchronizing mechanism, which synchronizes the rotations of respective gears by a friction generated between the conical faces of the gears. This frictionally synchronizing mechanism comprises a clutch gear having a conical face, a synchronizer ring also having a conical face, and a synchro-hub. The clutch gear is provided on one of the input and output shafts of the transmission while the synchro-hub is provided on the other shaft, on which a synchro-sleeve is provided being slidable by a shift fork in the axial direction of the transmission.

When the driver operates the change-lever for a gear shift, the operational force is transmitted through the gear-shifting device to the shift fork, which shifts the synchro-sleeve. This shift of the synchro-sleeve causes the synchronizer ring to move toward the clutch gear, and the conical face inside the synchronizer ring fits to the conical face outside the clutch gear. As a result, a friction is generated between the synchronizer ring and the clutch gear. This friction acts to synchronize the synchronizer ring and the clutch gear to a same rotational speed, leading the splines provided outside the clutch gear to fit into the splines inside the synchro-sleeve.

By the way, when the synchro-sleeve is about to engage with the clutch gear after the synchronizer ring and the clutch gear have been synchronized, if these splines are not in alignment for a fitting, then the clutch gear rotates with respect to the synchro-sleeve and then engages with it. Because this engagement is established through the rotations of the synchronizer ring and the clutch gear driven by the synchro-sleeve, the synchro-sleeve itself receives from the clutch gear a reaction in the direction opposite to that of the shifting of the synchro-sleeve. This reaction force is referred to generally as "two-step engaging load".

Because this two-step engaging load is transmitted from the synchro-sleeve through the gear-shifting device to the change-lever, the driver, who operates the change-lever actuating the synchro-sleeve, must provide a relatively large force to prevail against the two-step engaging load for a gear shift. Therefore, for the driver to operate the change-lever comfortably, it is important to minimize the two-step engaging load, which acts to impair the maneuverability of the change-lever.

Not to generate such a two-step engaging load, Japanese Laid-Open Patent Publication No. 2000-240683 discloses a method in which the splines inside the synchro-sleeve are provided with chamfer teeth whose chamfer angle at their tooth roots is different from that at their tooth tops. In this method, when the synchro-sleeve pushes the synchronizer ring with the sides of the tooth tops, which have a relatively large chamfer angle, the force acting in the axial direction of the synchronizer ring is relatively large. As a result, a sufficient friction is generated between the synchro-sleeve and the synchronizer ring, facilitating the synchronization. On the other hand, when the synchro-sleeve pushes the synchronizer ring with the sides of the tooth roots, which have a relatively small chamfer angle, the force acting in the circumferential direction of the synchronizer ring is relatively large, facilitating the engagement of the synchronizer ring with the synchro-sleeve. As a result, the maneuverability of the change-lever is improved.

Also, Subaru technique No. 24 "Study on the prevention of 2-step motion in a gear change of manual transmission" issued in 1997, on pages 33~38, discloses a method for reducing the two-step engaging load, which is generated in gear shifting. In this method, the engagement of the synchronizer ring with the clutch gear is improved by modifying the shapes of the chamfer teeth of the synchro-sleeve and the clutch gear.

In addition to the above mentioned methods, Japanese Laid-Open Patent Publication No. H06(1994)-316227 discloses a method for improving the maneuverability of the change-lever to achieve pleasant shift operation. In this method, the two-step engaging load is damped by an elastic body provided between the change-lever and the vehicle body supporting the change-lever, or the stiffness of the change-lever itself is reduced, or the force required for the operation of the change-lever is reduced by increasing the leverage of the system that transmits the operational force from the change-lever to the synchro-sleeve.

However, the increase of the leverage of the system transmitting the operational force from the change-lever to the synchro-sleeve also increases the stroke of the change-lever. In this respect, such a change-lever has a space limitation in the interior of the vehicle, and also, there is a limit to the increasing of the leverage from the point of view of the maneuverability of the change-lever. Therefore, there is a need for a manual transmission whose gear-shifting device is equipped with a change-lever that provides a maneuverability improved by a method other than the above mentioned method of increasing the leverage.

SUMMARY OF THE INVENTION

In consideration of the above mentioned problems, it is an object of the present invention to provide a gear-shifting device for a manual transmission, which device comprises an attenuator for reducing the load acting on the change-lever from the shift fork and thereby improves the maneuverability of the change-lever.

A gear-shifting device for a manual transmission according to the present invention comprises a shift arm and a shift piece (for example, the 1st-2nd speed shift piece 41 described in the following embodiment). The shift arm is mounted over a shift selector shaft, which is rotatable in correspondence to the shift operation of a change-lever, and the shift arm is capable of rotating with respect to the shift selector shaft. The shift piece is in contact with the arm portion of the shift arm and is pushed to shift by the arm portion in correspondence to the rotation of the shift arm. This shifting of the shift piece transmits the operational force applied in the shift operation to a synchro-sleeve (for example, the 1st-2nd speed synchro-sleeve 71 described in the following embodiment) for a gear shift. The gear-shifting device further comprises an attenuating mechanism (for example, the load-attenuating mechanism 90 described in the following embodiment), which is provided in a system that transmits the operational force between the shift selector shaft and the synchro-sleeve. The attenuating mechanism attenuates the load transmitted through the shift arm to the shift selector shaft.

According to this gear-shifting device, so-called two-step engaging loads, which are transmitted from the clutch gear to the gear-shifting device in gear shifting, are reduced by the attenuating mechanism, which is provided especially at the shift arm. This attenuating mechanism is positioned closer to the synchro-sleeve than to the shift stopper of the shift arm, so little two-step engaging load is transmitted from the gear-shifting device to the change-lever. Therefore, without considering the rigidity of the shift lever, the maneuverability of the shift operation is improved for the driver to operate the change-lever comfortably.

In the above described gear-shifting device for a manual transmission, the shift arm may comprise a first shift arm, which rotates together with the shift selector shaft as a one-piece body, and a second shift arm, which can rotate with respect to the shift selector shaft. With this arrangement, the second shift arm is rotated with respect to the shift selector shaft through the attenuating mechanism, which is provided on the rotational side of the second shift arm, to attenuate the load.

Furthermore, in the above described gear-shifting device for a manual transmission, preferably, the attenuating mechanism comprises an engaging groove (for example, the spline groove 51b described in the following embodiment), a fitting room, a spherical body (for example, the steel ball 92 described in the following embodiment), and a resilient body (for example, the coned spring 93 described in the following embodiment). The engaging groove is provided extending axially on the peripheral surface of the shift selector shaft. The fitting room is provided at the part of the second shift arm that fits rotatably over the shift selector shaft, and it has an opening that faces the engaging groove. The spherical body is placed in the fitting room to meet and engage with the engaging groove, and the resilient body is also placed in the fitting room to bias the spherical body to the engaging groove. With this attenuating mechanism, when the shift selector shaft and the second shift arm rotate with respect to each other within a predetermined angle, the spherical body being pushed against the bias of the resilient body shifts in a direction coming out of the engaging groove, allowing the second shift arm to rotate with respect to the shift selector shaft. On the other hand, when the shift selector shaft and the second shift arm rotate with respect to each other beyond the predetermined angle, the spherical body shifting in the direction out of the engaging groove compresses the resilient body completely, engaging the shift selector shaft and the second shift arm through the compressed spherical body for the shift selector shaft and the second shift arm to rotate together as a one-piece body.

In the above described gear-shifting device for a manual transmission, this load-attenuating mechanism can comprise small members like the spherical body and the resilient body, so the attenuating mechanism does not require much space for its installation. Therefore, the gear-shifting device according to the present invention can be still designed in a compact form and manufactured with little cost increase.

Furthermore, the present invention does not increase the leverage of the system that transmits the operational force from the change-lever to the synchro-sleeve to reduce the operational load, so it never increases the stroke of the change-lever. Therefore, the present invention does not require any increase in the installation space for the change-lever. Even if the change-lever has a shortened stroke, the present invention achieves good maneuverability for the change-lever, ensuring for the driver comfortable operation of the change-lever.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
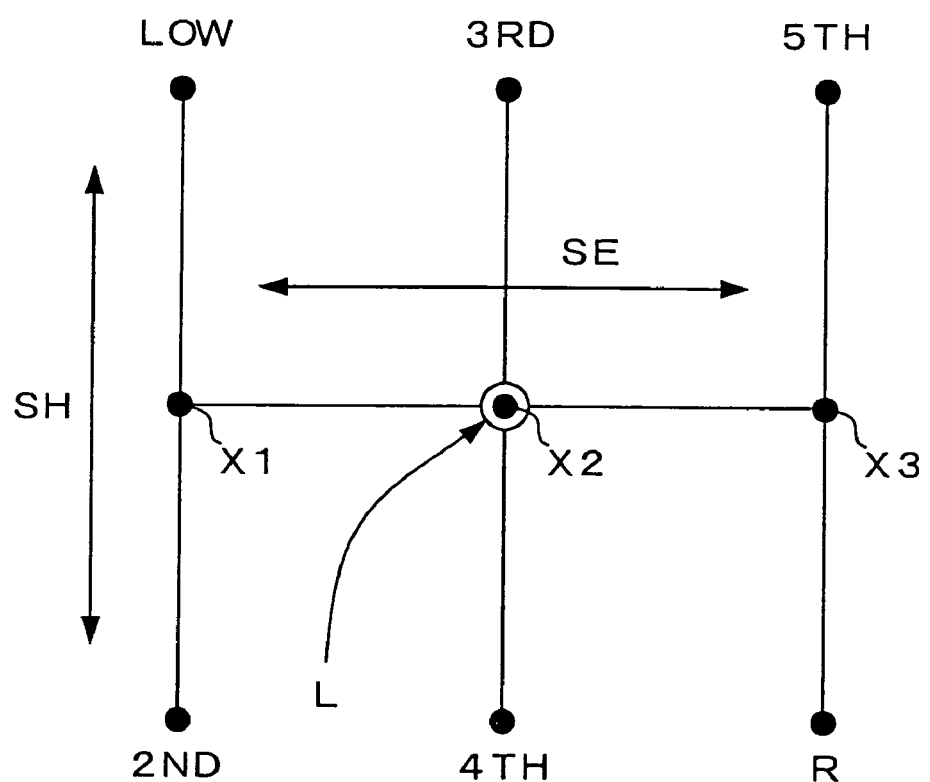
FIG. 1 is a diagram describing patterns for the operation of a change-lever.

Now, a preferred embodiment of gear-shifting device for a manual transmission according to the present invention is described in reference to FIGS. 1~7.

This manual transmission transmits the driving force of an engine with speed ratio change control, in which Low, 2nd~5th and Reverse clutches are selectively engaged by the driver who operates the change-lever L provided at the driver seat. Therefore, at first, the system that transmits this operational force is described in the following.

The change-lever L, which is used to select one of the 1st~5th speed change ratios and reverse ratio (hereinafter referred to as "R speed"), is operated in the patterns shown in FIG. 1. If the change-lever L is operated in the direction indicated by SE in the drawing, then it can be positioned at one of the three selecting positions: 1st-2nd speed selecting position X1, 3rd-4th speed selecting position X2, and 5th-R speed selecting position X3. Then, while the change-lever L is at the 1st-2nd speed selecting position X1, if it is shifted in the direction indicated by SH, which is perpendicular to the above mentioned operational direction SE, either the 1st speed position LOW or the 2nd speed position 2ND is selectable. Likewise, while the change-lever L is at the 3rd-4th speed selecting position X2, if it is shifted in the direction indicated by SH, either the 3rd speed position 3RD or the 4th speed position 4TH is selectable. Also, at the 5th-R speed selecting position X3, if the change-lever L is shifted in the direction indicated by SH, either the 5th speed position 5TH or the reverse position R is selectable.

Figure 2:
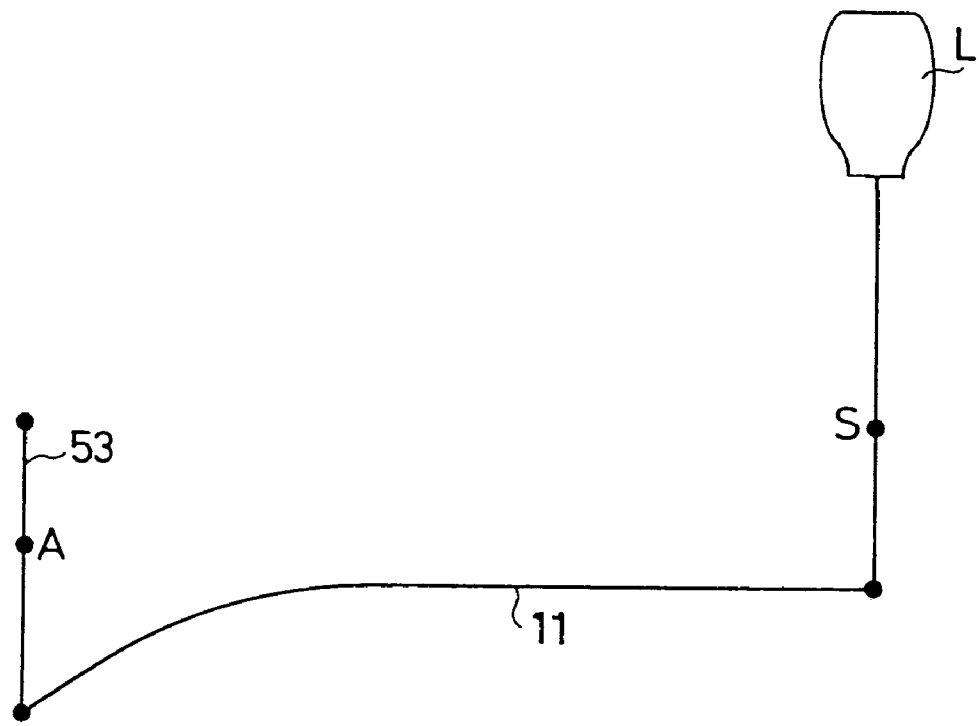
FIG. 2 is a schematic diagram describing a system that transmits the operational force applied on the change-lever.

When the driver operates the change-lever L to any of the above mentioned speed change positions, the change-lever L swings around the position indicated by point S in FIG. 2 as fulcrum. As a result, the force applied on the change-lever L by the driver in the operation is transmitted through a shift cable 11 to a shift arm 53, which rotates around its central axis A. Therefore, the system to transmit the operational force from the change-lever L to the shift arm 53 comprises a plurality of levers, the shift cable 11, and parts for connecting these components.

Figure 3:
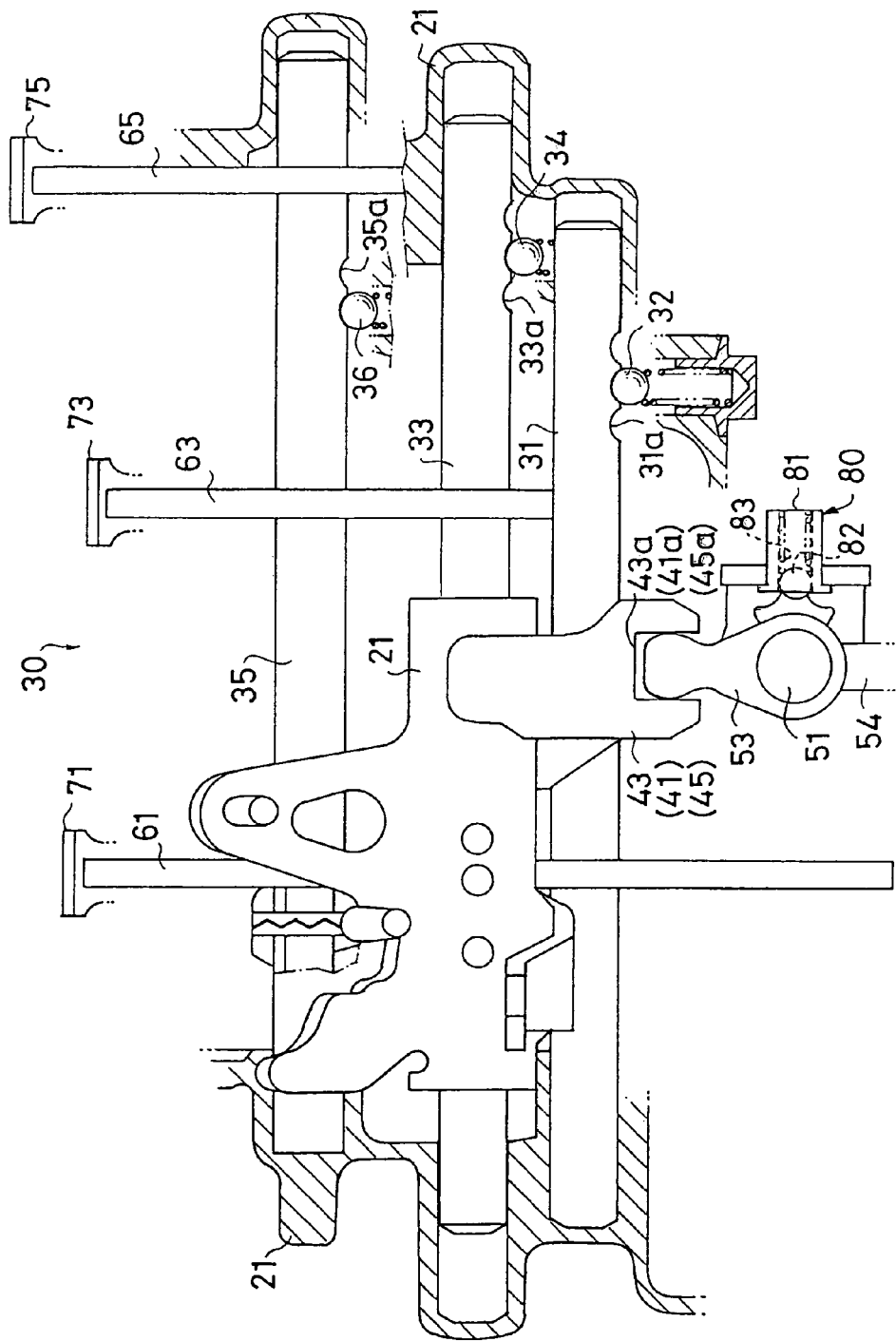
FIG. 3 is a sectional plan view showing components of the system that transmits the operational force in a manual transmission equipped with a gear-shifting device according to the present invention.

FIG. 3 shows the system 30 that transmits the operational force (shifting force) in the manual transmission that is equipped with the gear-shifting device according to the present invention. This operational force transmitting system 30, which is provided in the transmission case 21, comprises a 1st-2nd speed shift fork shaft 31, a 3rd-4th speed shift fork shaft 33 and a 5th-R speed shift fork shaft 35, which are movable longitudinally and axially. The 1st-2nd speed shift fork shaft 31 has detent grooves 31a, which constitute a detent mechanism 32. By this mechanism, the 1st-2nd speed shift fork shaft 31 is positioned at any one of the three positions, LOW, Neutral, and 2ND. Likewise, the 3rd-4th speed shift fork shaft 33 and the 5th-R speed shift fork shaft 35 have detent grooves 33a and 35a, respectively, which constitute detent mechanisms 34 and 36, respectively. By these mechanisms, the 3rd-4th speed shift fork shaft 33 is positioned at any one of the three positions, 3RD, Neutral, and 4TH, and the 5th-R speed shift fork shaft 35 at either of the two positions, 5TH and Reverse (R), respectively.

Furthermore, the 1st-2nd speed shift fork shaft 31, the 3rd-4th speed shift fork shaft 33 and the 5th-R speed shift fork shaft 35 are connected to a 1st-2nd speed shift piece 41, a 3rd-4th speed shift piece 43 and a 5th-R speed shift piece 45, respectively, which are supported in the transmission case 21. These shift pieces 41, 43 and 45 are movable axially together with their respective shift fork shafts 31, 33 and 35. FIG. 3 shows only the 3rd-4th speed shift piece 43 because this drawing shows a condition that the shift pieces 41, 43 and 45 are positioned one over another in the direction perpendicular to the paper carrying the drawing.

Each shift piece 41, 43 or 45 is provided with an approximately U shaped selector groove 41a, 43a or 45a, respectively, and one of these selector grooves 41a, 43a and 45a is engaged with the top end of the shift arm 53, which will be described in detail later. When the change-lever L is swung in the SE direction shown in FIG. 1, each selector groove 41a, 43a or 45a selectively and correspondingly comes into contact with the top end of the shift arm 53. If the change-lever L is swung in the SH direction in FIG. 1, then the shift piece 41, 43 or 45 that has the selector groove 41a, 43a or 45a selectively engaged with the shift arm 53 is shifted with the corresponding shift fork shaft 31, 33 or 35 in the axial direction.

The 1st-2nd speed shift fork shaft 31, the 3rd-4th speed shift fork shaft 33 and the 5th-R speed shift fork shaft 35 are provided with a 1st-2nd speed shift fork 61, a 3rd-4th speed shift fork 63, and a 5th-R speed shift fork 65, respectively. The 1st-2nd speed shift fork 61 is engaged with a 1st-2nd speed synchro-sleeve 71, which actuates a 1st clutch or a 2nd clutch (not shown). The 3rd-4th speed shift fork 63 is engaged with a 3rd-4th speed synchro-sleeve 73, which actuates a 3rd clutch or a 4th clutch (not shown). The 5th-R speed shift fork 65 is engaged with a 5th-R speed synchro-sleeve 75, which actuates a 5th clutch or a reverse clutch (not shown).

With this arrangement, the appropriate operation of the change-lever L makes the shift arm 53 to engage selectively with the selector grooves 41a, 43a and 45a of the 1st-2nd speed shift piece 41, the 3rd-4th speed shift piece 43 and the 5th-R speed shift piece 45 and then makes the selectively engaged 1st-2nd speed shift fork shaft 31, 3rd-4th speed shift fork shaft 33 and 5th-R speed shift fork shaft 35 to shift axially. As a result, the 1st~5th clutches and the reverse clutch are selectively actuated to establish the corresponding speed change ratios, LOW~R.

Figure 4:
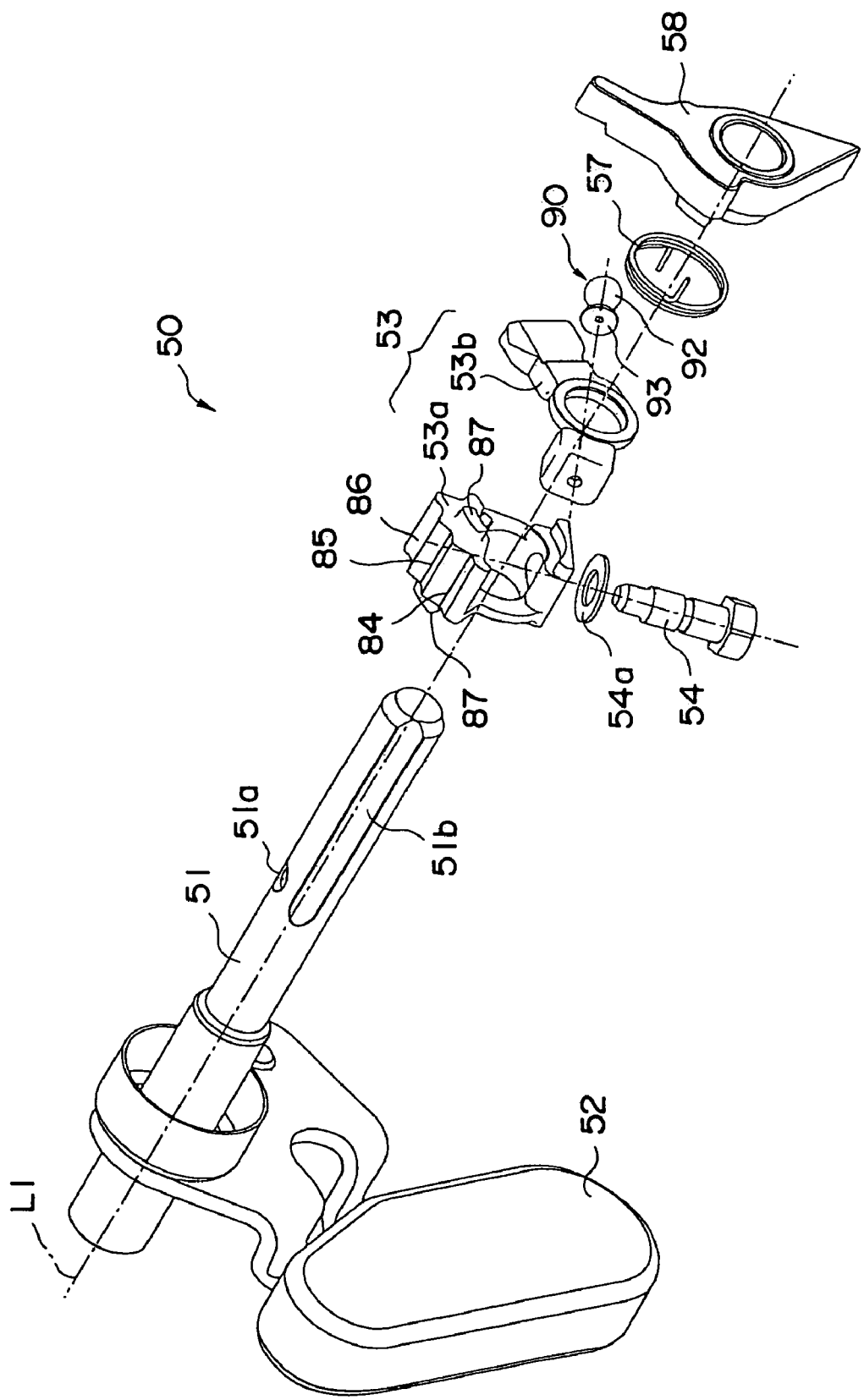
FIG. 4 is an exploded view showing the gear-shifting device according to the present invention.
Figure 5:
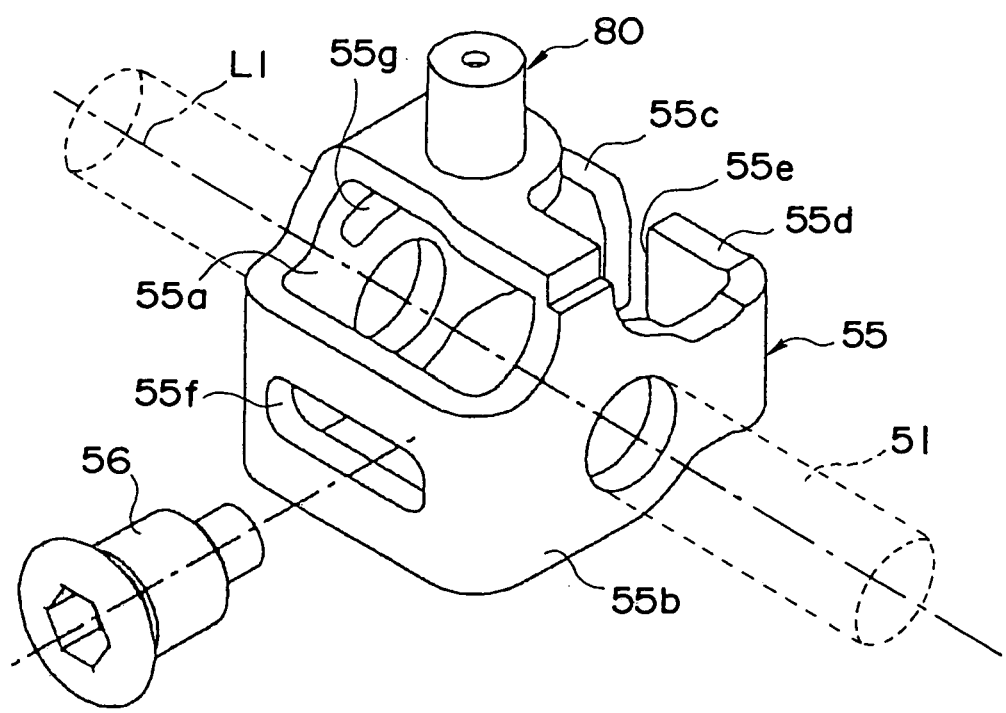
FIG. 5 is an exploded view showing an interlock plate and related parts, which are provided in the gear-shifting device.
Figure 6:
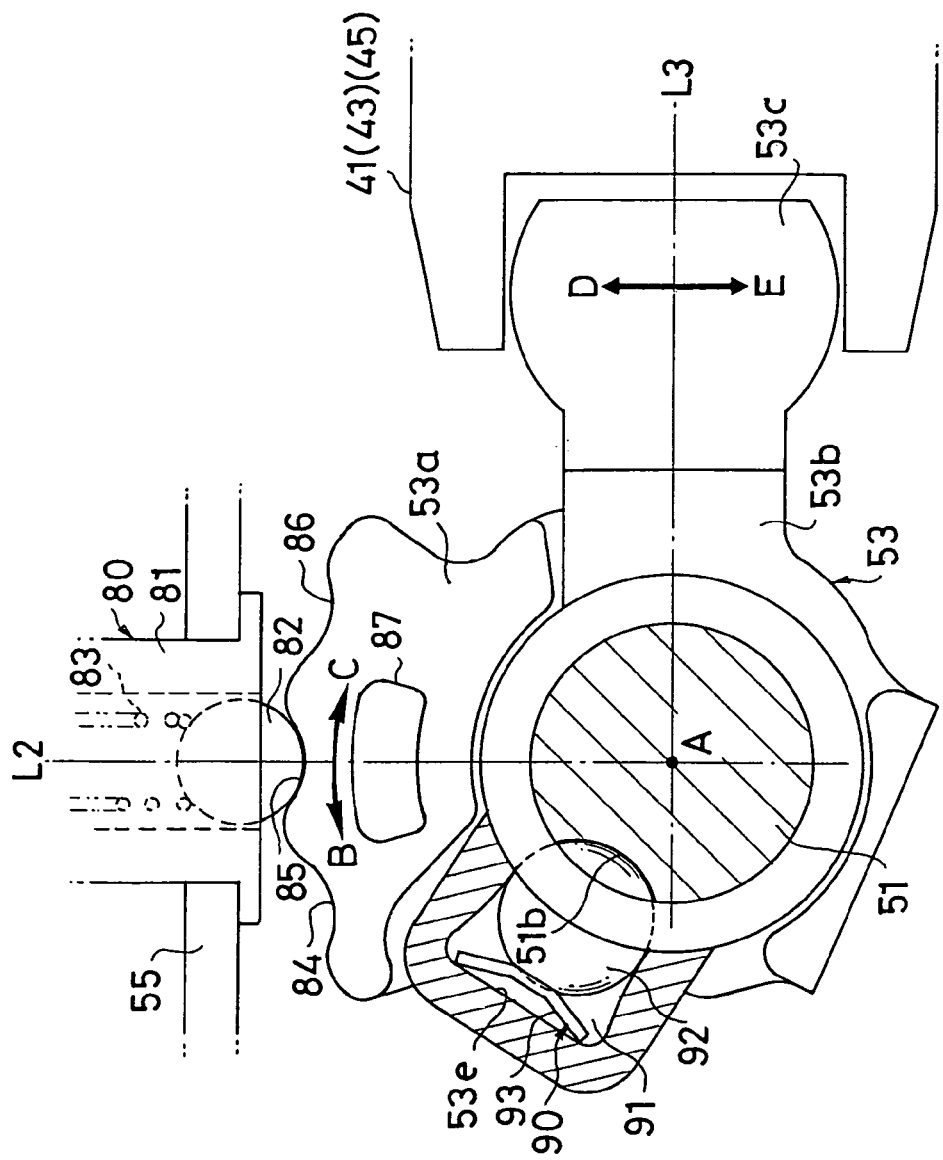
FIG. 6 is a view showing a load-attenuating mechanism and related parts, which are provided in the gear-shifting device.

Now, the gear-shifting device according to the present invention is described in reference to FIG. 4~FIG. 6. As shown in FIG. 4, the gear-shifting device 50 comprises such members as a shift selector shaft 51, a shift lever 52, the above mentioned shift arm 53, a detent mechanism 80 and a load-attenuating mechanism 90 and an interlock plate 55 (shown in FIG. 5 but not shown in FIG. 4), into which the shift arm 53 is inserted.

When the change-lever L is swung in the SE direction in FIG. 1, this movement is transmitted through members such as the shift cable 11 to shift the shift selector shaft 51 axially. When the change-lever L is swung in the SH direction in FIG. 1, this movement is transmitted through members such as the shift cable 11 to swing the shift lever 52, which is fixed on the shift selector shaft 51. As a result, the shift selector shaft 51 is rotated around its axis L1.

The shift arm 53 comprises two separate members, a first shift arm 53a and a second shift arm 53b, which are fit to each other. Both these members 53a and 53b are provided with circular holes, through which the shift selector shaft 51 is placed. The first shift arm 53a is fixed on the shift selector shaft 51 by a bolt 54, which is screwed through a washer 54a into a fixing bore 51a provided on a side of the shift selector shaft 51. Furthermore, the shift selector shaft 51 is provided with an axially extending spline groove 51b on a side thereof, and the spline groove 51b is used to actuate the load-attenuating mechanism 90.

The shift selector shaft 51 is equipped also with the interlock plate 55 as shown in FIG. 5. The interlock plate 55 comprises a pair of side plates 55a and 55b, a pair of locking nails 55c and 55d, and a slit 55e. The side plates 55a and 55b are distanced from each other in the direction of the axis L1 of the shift selector shaft 51, which is arranged to pass through the side plates. The locking nails 55c and 55d extend from the side plates 55a and 55b, respectively, forming the slit 55e between the locking nails in a plane that intersects the axis L1 of the shift selector shaft 51.

The interlock plate 55 is provided with a guiding groove 55f, which extends along the axis L1 of the shift selector shaft 51. In the guiding groove 55f, an interlock bolt 56 is fit and fixed on the transmission case 21. As a result, the movement of the interlock plate 55 along the axis L1 of the shift selector shaft 51 is allowed within a limit while the rotation of the interlock plate 55 around the axis L1 is prevented by the interlock bolt 56.

The interlock plate 55 is provided also with a shift-stopper engaging groove 55g along the circumference of the shift selector shaft 51, on the side facing the shift lever 52, and the shift-stopper engaging groove 55g is engaged with the shift stopper 87 of the detent mechanism 80 of the first shift arm 53a. As a result, the relative rotation of the first shift arm 53a around the shift selector shaft 51 beyond a predetermined degree is restricted as the shift selector shaft 51 rotates around the axis L1.

The above mentioned shift arm 53, a driven arm 58 and a torsion spring 57 are provided on the shift selector shaft 51 between both the side plates 55a and 55b of the interlock plate 55, such that the shift selector shaft 51 is positioned through these members covered with the interlock plate 55. The torsion spring 57 connects the shift arm 53 and the driven arm 58, so the driven arm 58 follows the movement of the shift arm 53. As a result, when the shift arm 53 engages with the selector groove 45a of the 5th-R speed shift piece 45, the driven arm 58 also engages with the selector groove 45a and prevents the change-lever L from shifting directly from the reverse position R to the fifth speed position 5TH.

Now, the shift arm 53, the load-attenuating mechanism 90, and related components are described in reference to FIG. 6, which shows the condition where the shift arm 53 is engaged with the 1st-2nd speed shift piece 41. As mentioned above, the shift arm 53 comprises two members, which are the first shift arm 53a and the second shift arm 53b. The first shift arm 53a, which engages with the detent mechanism 80 described later, is fit on the shift selector shaft 51 so that the first shift arm 53a and the shift selector shaft 51 can rotate together as a one-piece body. The second shift arm 53b, which has an arm portion 53c that engages with the 1st-2nd speed shift piece 41, is mounted over the shift selector shaft 51, allowing a relative rotation between them. As a result, when the change-lever L is swung in the SE direction indicated in FIG. 1, the second shift arm 53b is shifted in the direction that is perpendicular to the paper carrying the drawing of FIG. 6. Then, when the change-lever L is swung in the SH direction in FIG. 1, the second shift arm 53b is turned correspondingly clockwise or counterclockwise around the axis A indicated in FIG. 6.

Between the first shift arm 53a and the interlock plate 55, provided is a detent mechanism 80, which comprises a flanged retaining tube 81, a ball 82, a spring 83, detent grooves 84, 85 and 86, and a shift stopper 87. The retaining tube 81 has an axis L2 that is perpendicular to the axis L1 of the shift selector shaft 51. The ball 82 is held inside the retaining tube 81 so that it can move along the axis L2 of the retaining tube 81. The spring 83 is also provided inside the retaining tube 81, so that it biases the ball 82 toward the first shift arm 53a. The three detent grooves 84, 85 and 86 are provided circumferentially on the first shift arm 53a at even intervals, so each of them can engage with the ball 82. The shift stopper 87 protrudes circumferentially along the shift selector shaft 51.

The detent mechanism 80 defines angular positions 84 and 86 (where the ball 82 engages with the detent grooves 84 and 86, respectively) for the shift arm 53, which is turned clockwise and counterclockwise around the axis A from its neutral position (where the ball 82 engages with the detent groove 85) shown in FIG. 6. When the first shift arm 53a is turned for a predetermined angle counterclockwise (indicated by arrow B in the drawing) from the neutral position to bring the ball 82 into engagement with the detent groove 86, the second shift arm 53b with its axis L3 is also turned for a predetermined degree in the same B direction through the load-attenuating mechanism 90, which is described later. As a result, the 1st-2nd speed shift piece 41, which is pushed by the arm portion 53c, is shifted by a predetermined distance in the direction indicated by arrow D in the drawing, transmitting the operational force to the 1st-2nd speed shift fork 61. On the other hand, when the first shift arm 53a is turned for a predetermined angle clockwise (indicated by arrow C in the drawing) from the neutral position to bring the ball 82 into engagement with the detent groove 84, the second shift arm 53b is also turned for a predetermined degree in the C direction through the load-attenuating mechanism 90. As a result, the 1st-2nd speed shift piece 41, which is pushed by the arm portion 53c, is shifted by a predetermined distance in the direction indicated by arrow E in the drawing, transmitting the operational force to the 1st-2nd speed shift fork 61. The shift stopper 87 limits the turning of the first shift arm 53a in the B and C directions within the predetermined angles. Therefore, the shift amount of the 1st-2nd speed shift piece 41 (also the amount of the 1st-2nd speed shift fork shaft 31 shifting axially) never exceeds the predetermined distance.

The load-attenuating mechanism 90 comprises the above mentioned spline groove 51b, which extends axially on the outer surface of the shift selector shaft 51, a fitting room 91, a steel ball 92 and a coned spring 93. The fitting room 91 is provided as part of the second shift arm 53b, which is mounted fittingly over the shift selector shaft 51 and rotates with respect to the shift selector shaft 51, such that the opening of the fitting room 91 faces the spline groove 51b. The steel ball 92 and the coned spring 93 are placed in the fitting room 91, so that the steel ball 92, which is biased toward the spline groove 51b by the coned spring 93, engages with the spline groove 51b.

For example, if the change-lever L is operated to the 1st speed position LOW, then the shift selector shaft 51 is turned counterclockwise around the axis A. In this instance, the steel ball 92, which is in engagement with the spline groove 51b, is pushed to the coned spring 93 against the biasing force of the coned spring 93. As a result, the coned spring 93 contracts allowing the steel ball 92 to shift from the condition shown in FIG. 6 deeper into the fitting room 91 surrounded by the internal wall 53e inside the second shift arm 53b. Then, the coned spring 93 resiliently comes into complete contact with the internal wall 53e, allowing the steel ball 92 to come into contact with the internal wall 53e of the second shift arm 53b.

In this condition, the shift selector shaft 51 is engaged with the second shift arm 53b through the steel ball 92, so the shift selector shaft 51 and the second shift arm 53b are turned counterclockwise (in the direction indicated by arrow B) around the axis A as if they were a one-piece body. As a result, the 1st-2nd speed shift piece 41, which is pushed by the arm portion 53c, is shifted in the direction indicated by arrow D, transmitting the operational force from the change-lever L to the 1st-2nd speed synchro-sleeve 71.

Figure 7:
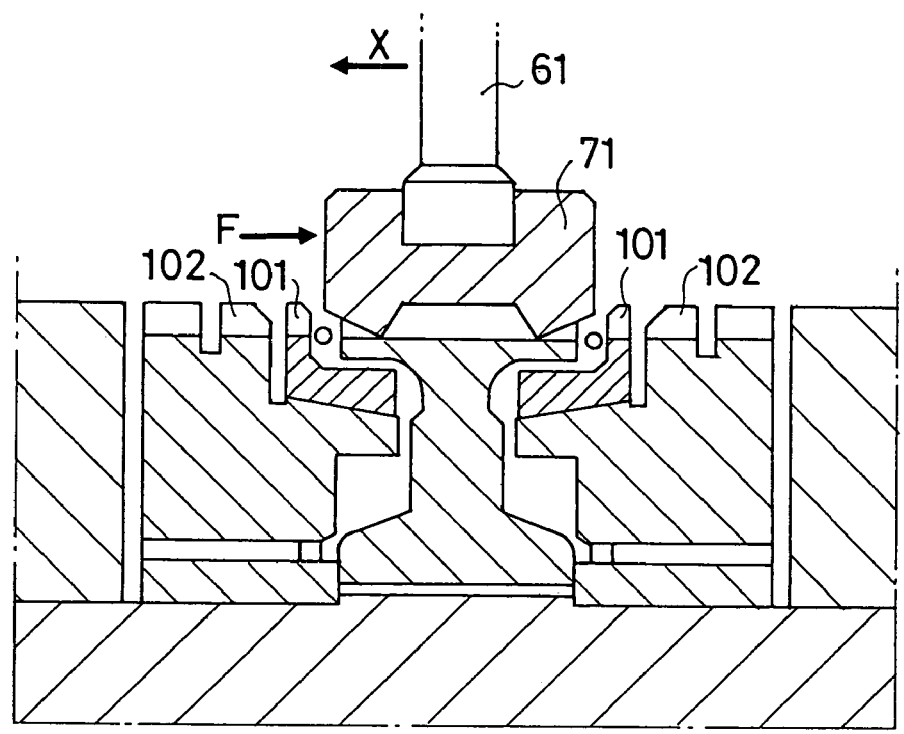
FIG. 7 is a sectional view showing the 1st-2nd speed synchro-sleeve and related parts provided in the manual transmission.

Now, the function of the load-attenuating mechanism 90 to reduce a so-called two-step engaging load, which is transmitted from the 1st-2nd speed synchro-sleeve 71 to the change-lever L, is described in reference to FIG. 6 and FIG. 7. As shown in FIG. 7, the 1st-2nd speed synchro-sleeve 71 is shifted in the direction indicated by arrow X by the operational force transmitted to the 1st-2nd speed shift fork 61, pushing the synchronizer ring 101 to the 1st speed clutch gear 102. In this way, the rotations of the synchronizer ring 101 and the 1st speed clutch gear 102 are brought into synchronization, and then when the 1st-2nd speed synchro-sleeve 71 is shifted further in the direction indicated by arrow X, the 1st-2nd speed synchro-sleeve 71 comes into engagement with the 1st speed clutch gear 102. In this instance, if the splines provided in the inner periphery of the 1st-2nd speed synchro-sleeve 71 and those provided in the outer periphery of the 1st speed clutch gear 102 are not aligned in meshing position with each other, then the synchronizer ring 101 rotates with respect to the 1st speed clutch gear 102 in preparation for an engagement, generating a friction between the synchronizer ring 101 and the 1st speed clutch gear 102. As a result, the 1st-2nd speed synchro-sleeve 71 receives a force as reaction F from the 1st speed clutch gear 102 through the synchronizer ring 101 in the direction opposite to the shifting direction X. This reaction force is a so-called two-step engaging load.

This reaction force F is transmitted from the 1st-2nd speed synchro-sleeve 71 through the 1st-2nd speed shift fork 61, the 1st-2nd speed shift fork shaft 31, the 1st-2nd speed shift piece 41 to the arm portion 53c, acting in the clockwise direction to return the second shift arm 53b to the neutral position. However, the second shift arm 53b never returns to the neutral position, because the angle of the second shift arm 53b rotated by the reaction force F is within a few degrees, which is smaller than the above mentioned predetermined angle required for the detent grooves to shift in the detent mechanism 80. Furthermore, this small rotation by the reaction force F is not enough for the second shift arm 53b to result in an engagement with the shift selector shaft 51 through the steel ball 92 because the steel ball 92 is pushed and positioned in the spline groove 51b by the resiliency of the coned spring 93. As a result, the second shift arm 53b rotates with respect to the shift selector shaft 51, hardly transmitting the reaction force F to the shift selector shaft 51. Therefore, there is no chance for the two-step engaging load to be transmitted to the change-lever L, so the shift selector shaft 51 does not rotate around the axis A shown in FIG. 6.

A preferred embodiment according to the present invention has been described above. However, the scope of the present invention is not limited to the described embodiment, in which the load-attenuating mechanism 90 is provided between the shift selector shaft 51 and the second shift arm 53b. As long as the load being transmitted from each synchro-sleeve 71, 73 or 75 to the shift selector shaft 51 is attenuated, a load-attenuating mechanism may be provided in any other position. For example, a load-attenuating mechanism may be provided at each of the parts where the shift pieces 41, 43 and 45 engage with the arm portion 53c of the second shift arm 53b to attenuate the load being transmitted to the second shift arm 53b.

In the above embodiment, the spherical body that constitutes the load-attenuating mechanism 90 is a steel ball 92, and the resilient body is a coned spring 93. However, for constituting the load-attenuating mechanism 90, instead of the steel ball 92, for example, a metal ball made of another material, a plastic ball, or a ceramic ball may be used as the spherical body, and instead of the coned spring 93, for example, a coil spring, a plate spring, or rubber may be used as the resilient body.

As described above, in the gear-shifting device for a manual transmission, according to the present invention, the shift arm is provided with an attenuating mechanism to reduce the so-called two-step engaging load that is transmitted from the clutch gear to the gear-shifting device at the time of gear shifting. This attenuating mechanism is positioned closer to the synchro-sleeve than to the shift stopper of the shift arm, so that the two-step engaging load is hardly transmitted from the gear-shifting device to the change-lever. In this way, without considering the rigidity of the shift lever, the maneuverability of the gear shifting is improved for the driver to operate the change-lever comfortably.

Furthermore, this load-attenuating mechanism can comprise small members like the above mentioned spherical body and resilient body, so it does not require much space in a gear-shifting device, which is comparatively large. Therefore, the gear-shifting device according to the present invention can be still designed in compactness and manufactured with little cost increase.

In addition, the present invention does not involve any increase of the leverage of the system that transmits the operational force from the change-lever to the synchro-sleeve, so it never increases the stroke of the change-lever. Therefore, the present invention does not require any increase in the installation space of the change-lever. Even if the change-lever has a shortened stroke, the maneuverability of the change-lever is relatively good, ensuring comfortable operation of the change-lever.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2003-193989 filed on Jul. 9, 2003 which is incorporated herein by reference.

What is claimed is:

1. A gear-shifting device for a manual transmission, comprising a shift arm and a shift piece, said shift arm being mounted over a shift selector shaft and being rotatable with respect to said shift selector shaft rotatable in correspondence to a shift operation of a change-lever, and said shift piece being in contact with an arm portion of said shift arm and being pushed to shift by said arm portion in correspondence to a rotation of said shift arm, said shift of said shift piece transmitting an operational force applied in said shift operation to a synchro-sleeve for a gear shift;

wherein:

said gear-shifting device further comprises an attenuating mechanism, which is provided in a system that transmits said operational force between said shift selector shaft and said synchro-sleeve, said attenuating mechanism attenuating a load transmitted through said shift arm to said shift selector shaft;

wherein:

said shift arm comprises a first shift arm, which rotates together with said shift selector shaft as a one-piece body, and a second shift arm, rotatable with respect to said shift selector shaft;

said second shift arm is rotated with respect to said shift selector shaft through said attenuating mechanism, which is provided on a rotational side of said second shift arm, to attenuate said load, and wherein:

said attenuating mechanism comprises an engaging groove, which is provided extending axially on a peripheral surface of said shift selector shaft, a fitting room, which is provided at part of the second shift arm that fits rotatably over said shift selector shaft and which has an opening that faces said engaging groove, a spherical body, which is placed in said fitting room to meet and engage with said engaging groove, and a resilient body, which is also placed in said fitting room to bias said spherical body toward said engaging groove;

when said shift selector shaft and said second shift arm rotate with respect to each other within a predetermined angle, said spherical body being pushed against the bias of said resilient body shifts in a direction coming out of said engaging groove, allowing said second shift arm to rotate with respect to said shift selector shaft; and when said shift selector shaft and said second shift arm rotate with respect to each other beyond said predetermined angle, said spherical body shifting in said direction out of said engaging groove compresses said resilient body substantially completely, engaging said shift selector shaft and said second shift arm through said compressed spherical body for said shift selector shaft and said second shift arm to rotate together as a one-piece body.

2. The gear-shifting device for a manual transmission, as set forth in claim 1, wherein said resilient body is a coned spring.

3. The gear-shifting device for a manual transmission, as set forth in claim 1 or 2, wherein even in a condition where said resilient body has been compressed completely, at least part of said spherical body is still engaged with said engaging groove.

* * * * *